US010213748B2

(12) United States Patent
Tsapatsis et al.

(10) Patent No.: US 10,213,748 B2
(45) Date of Patent: Feb. 26, 2019

(54) PORE OPENED ZEOLITE NANOSHEETS AND THEIR SUSPENSIONS AND METHODS AND USES RELATED THERETO

(71) Applicant: Regents of the University of Minnesota, Minneapolis, MN (US)

(72) Inventors: Michael Tsapatsis, Edina, MN (US); Qiang Xiao, Minneapolis, MN (US); Han Zhang, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 146 days.

(21) Appl. No.: 15/386,217

(22) Filed: Dec. 21, 2016

(65) Prior Publication Data
US 2017/0173539 A1 Jun. 22, 2017

Related U.S. Application Data

(60) Provisional application No. 62/270,134, filed on Dec. 21, 2015.

(51) Int. Cl.
| | |
|---|---|
| *B01J 29/06* | (2006.01) |
| *B01D 71/02* | (2006.01) |
| *B01D 53/22* | (2006.01) |
| *C01B 39/48* | (2006.01) |
| *C01B 39/02* | (2006.01) |
| *B01J 29/70* | (2006.01) |
| *B01D 67/00* | (2006.01) |
| *B01J 37/34* | (2006.01) |
| *B01J 35/02* | (2006.01) |
| *B01J 35/00* | (2006.01) |
| *B01J 37/04* | (2006.01) |
| *B01J 35/06* | (2006.01) |
| *B01J 37/02* | (2006.01) |
| *B01J 29/40* | (2006.01) |
| *B01J 35/10* | (2006.01) |
| *B01J 37/12* | (2006.01) |

(52) U.S. Cl.
CPC ......... *B01D 71/028* (2013.01); *B01D 53/228* (2013.01); *B01D 67/0039* (2013.01); *B01D 67/0051* (2013.01); *B01J 29/06* (2013.01); *B01J 29/40* (2013.01); *B01J 29/70* (2013.01); *B01J 29/7038* (2013.01); *B01J 35/0006* (2013.01); *B01J 35/023* (2013.01); *B01J 35/065* (2013.01); *B01J 35/10* (2013.01); *B01J 37/0246* (2013.01); *B01J 37/04* (2013.01); *B01J 37/343* (2013.01); *C01B 39/026* (2013.01); *C01B 39/48* (2013.01); *B01D 2256/24* (2013.01); *B01D 2257/7022* (2013.01); *B01J 37/12* (2013.01); *B01J 2229/10* (2013.01); *B01J 2229/22* (2013.01); *B01J 2229/30* (2013.01); *B01J 2229/37* (2013.01)

(58) Field of Classification Search
CPC ............ B01D 67/0039; B01D 67/0051; B01D 71/028; B01D 53/228; C01B 39/026; B01L 29/7038; B01L 29/70; B01L 29/06; B01L 29/40; B01L 2229/10; B01L 2229/30; B01L 35/023; B01L 35/0006; B01L 35/065; B01L 37/343; B01L 37/04; B01L 37/0246
USPC ............................ 502/4, 60, 77, 527.15, 522
See application file for complete search history.

(56) References Cited

U.S. PATENT DOCUMENTS

| | | | |
|---|---|---|---|
| 8,153,099 B2 * | 4/2012 | Yoon ................... | B01D 67/0051 423/704 |
| 2008/0254969 A1 * | 10/2008 | Yoon ...................... | B82Y 15/00 502/74 |
| 2015/0045206 A1 | 2/2015 | Tsapatsis et al. | |

OTHER PUBLICATIONS

Agrawal et al., "Dispersible Exfoliated Zeolite Nanosheets and Their Application as a Selective Membrane," *Science.*, 334(6052):72-75, Oct. 7, 2011.
Agrawal et al., "Solution-processable exfoliated zeolite nanosheets purified by density gradient centrifugation," *AIChE J.*, 59(9):3458-3467, Sep. 2013.
Castarlenas et al., "Melt Compounding of Swollen Titanosilicate JDF-L1 with Polysulfone to Obtain Mixed Matrix Membranes for H2/CH4 Separation," *Ind Eng Chem Res.*, 52(5):1901-1907, 2013.
Chalasani et al., "Engineering New Layered Solids from Exfoliated Inorganics: a Periodically Alternating Hydrotalcite-Montmorillonite Layered Hybrid," *Sci Rep.*, 3:3498, 2013, 8 pages.
Choi et al., "Stable single-unit-cell nanosheets of zeolite MFI as active and long-lived catalysts," *Nature.*, 461:246-249 Sep. 10, 2009.
Coleman et al., "Two-dimensional nanosheets produced by liquid exfoliation of layered materials," *Science.*, 331(6017):568-571, Feb. 4, 2011.
Diaz et al., "Layered zeolitic materials: an approach to designing versatile functional solids," *Dalton Trans.*, 43(27):10292-10316, Jul. 21, 2014.
Han et al., "Extremely Efficient Liquid Exfoliation and Dispersion of Layered Materials by Unusual Acoustic Cavitation," *Sci Rep.*, 4:5133, 2014, 7 pages.

(Continued)

Primary Examiner — Elizabeth D Wood
(74) Attorney, Agent, or Firm — Fish & Richardson P.C.

(57) ABSTRACT

Methods for forming two-dimensional (2D) zeolite nanosheets include exposing a multi-lamellar (ML) zeolite material including an organic structure directing agent (OSDA) to a mixture including sulfuric acid and hydrogen peroxide under conditions sufficient to remove substantially all of the OSDA from the ML zeolite material; and after exposing the ML zeolite material, treating a solution containing the ML zeolite material to sonication and/or mixing under conditions sufficient to substantially exfoliate layers of the ML zeolite to obtain porous two-dimensional zeolite nanosheets that are substantially free of the OSDA. In some cases, without further treatment such as secondary growth of the zeolite coating layer, a deposit of the OSDA-free nanosheets on polymer support exhibits hydrocarbon isomer selectivity.

17 Claims, 17 Drawing Sheets

(56) References Cited

OTHER PUBLICATIONS

Hu et al., "Rapid detemplation of nanozeolite β: microwave-assisted Fenton-like oxidation," *Rsc Advances.*, 2:6036-6041, 2012.
Kim et al., "Membranes from nanoporous 1D and 2D materials: A review of opportunities, developments, and challenges," *Chem Eng Sci.*, 104:908-924, Dec. 18, 2013.
Liu et al., "Mechanism of template removal for the synthesis of molecular sieves using dielectric barrier discharge," *Catalysis Today.*, 256(Part 1):137-141, Nov. 2015.
Liu et al., "Synthesis of Organic Pillared MFI Zeolite as Bifunctional Acid-Base Catalyst," *Chem Mater.*, 27(5):1479-1487, 2015.
Melian-Cabrera et al., "Room temperature detemplation of zeolites through H2O2-mediated oxidation," *Chem Commun (Camb).*, 21:2744-2746, Jun. 7, 2005.
Na et al., "Disordered Assembly of MFI Zeolite Nanosheets with a Large Volume of Intersheet Mesopores," *Chem Mater.*, 23(5):1273-1279, 2011.
Nicolosi et al., "Liquid Exfoliation of Layered Materials," *Science.*, 340, 2013, 20 pages.
Ogino et al., "Sonication-Free Exfoliation of Graphite Oxide via Rapid Phase Change of Water," *Top Catal.*, 58(7-9):522-528, May 2015.
Park et al., "Hierarchically structure-directing effect of multi-ammonium surfactants for the generation of MFI zeolite nanosheets," *Chem Mater.*, 23(23):5131-5137, 2011.
Rangnekar et al., "2D Zeolite Coatings: Langmuir-Schaefer Deposition of 3 nm Thick MFI Zeolite Nanosheets," *Angew Chem Int Ed Engl.*, 54(22):6571-6575, May 26, 2015.
Tsapatsis., "2-dimensional zeolites," *AIChE J.*, 60(7):2374-2381, Jul. 2014.
Xing et al., "Detemplation with H2O2 and characterization of MCM-56," *Catalysis Communications.*, 9(2):234-238, Feb. 2008.

\* cited by examiner

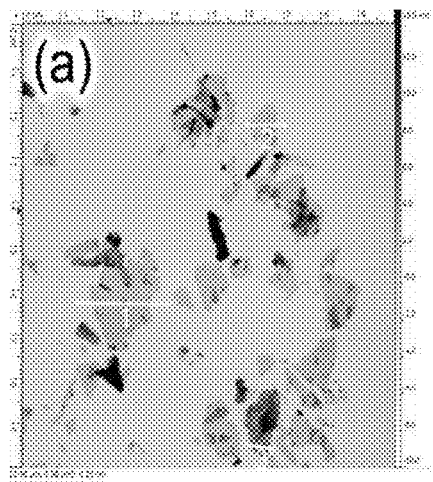
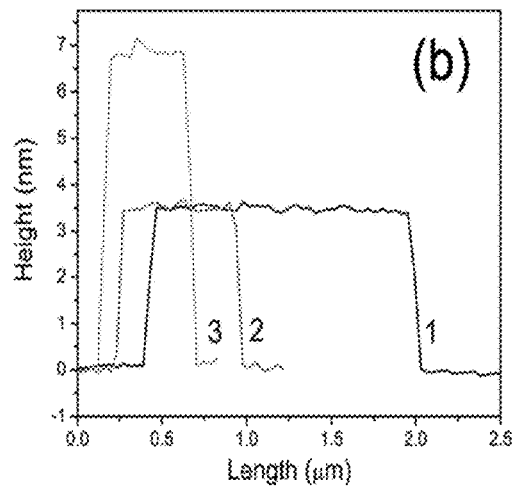
FIG. 8A  FIG. 8B
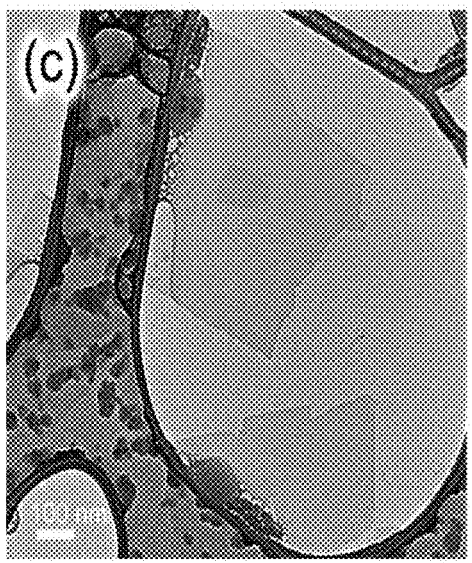
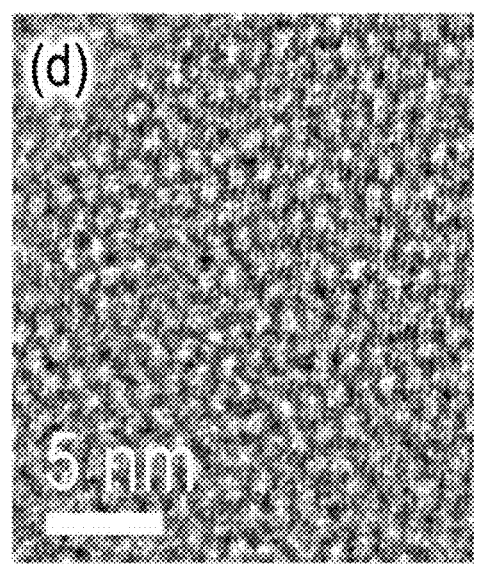
FIG. 8C  FIG. 8D

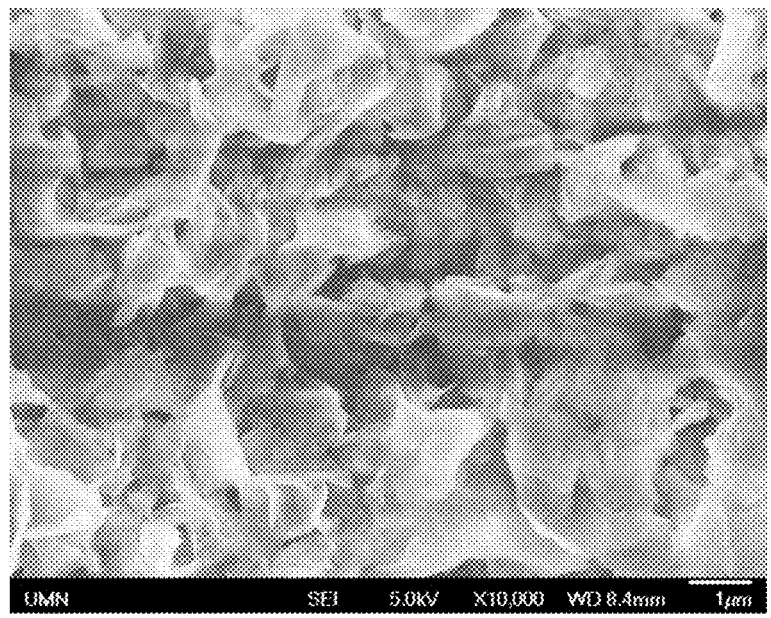
FIG. 14
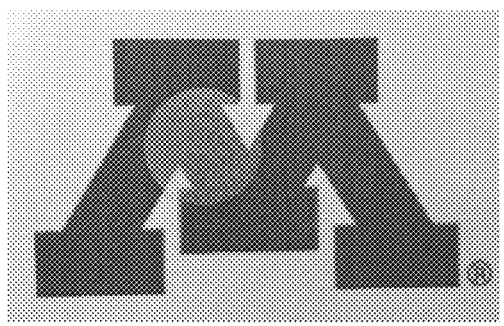
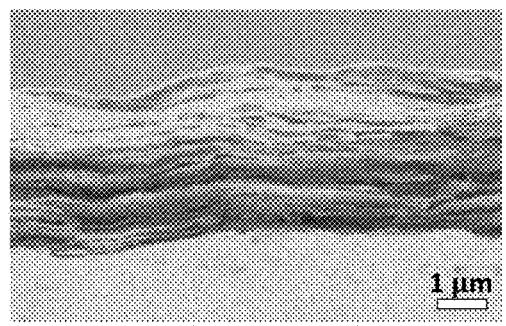
FIG. 16A  FIG. 16B

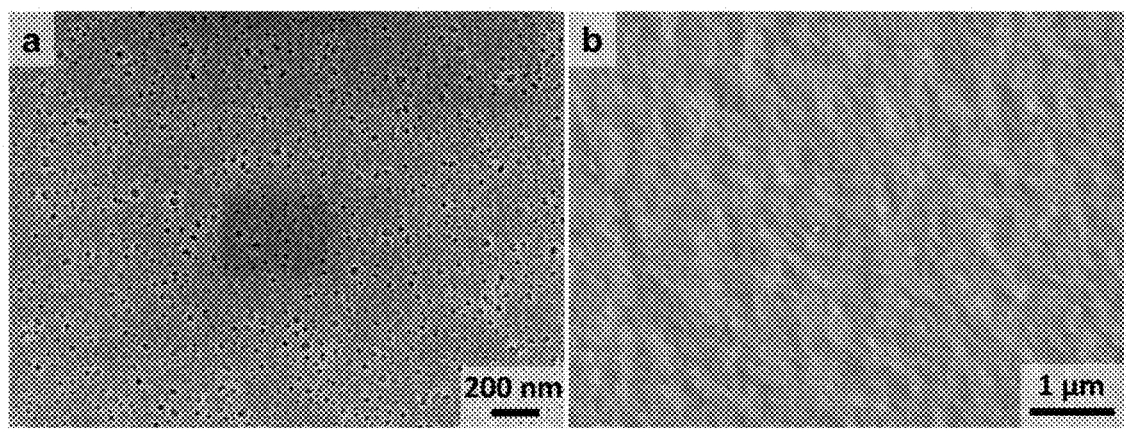
FIG. 20A  FIG. 20B

PORE OPENED ZEOLITE NANOSHEETS AND THEIR SUSPENSIONS AND METHODS AND USES RELATED THERETO

CROSS REFERENCE TO RELATED APPLICATIONS

This application is a non-provisional of and claims priority to U.S. Provisional Patent Application No. 62/270,134, filed on Dec. 21, 2015, the entire contents of which are hereby incorporated by reference.

STATEMENT AS TO FEDERALLY SPONSORED RESEARCH

This invention was made with Government support under contract number DE-AR0000338 awarded by DOE, Office of ARPA-E. The Government has certain rights in this invention.

TECHNICAL FIELD

This disclosure relates to pore opened zeolite nanosheets, suspensions of pore opened zeolite nanosheets, methods for forming pore opened zeolite nanosheets and suspensions, and uses of pore opened zeolite nanosheets and suspensions.

BACKGROUND

Two-dimensional (2D) zeolite nanosheets find uses in catalysis and separations as building blocks for the fabrication of membranes, catalysts, nanodevices, films etc. Currently, conventional preparation of 2D zeolite nanosheets relies on: 1) the availability of layered zeolite precursors; and 2) development of efficient exfoliation methods by which the layered zeolite precursors can be delaminated and dispersed in a solvent.

Zeolite Socony Mobil-5 (framework type MFI from ZSM-Five) is an aluminosilicate zeolite belonging to the pentasil family of zeolites. Recently, multi-lamellar MFI (ML-MFI) zeolites, which feature 1.5-unit-cell MFI nanosheets stacked along the b-axis have been synthesized in the presence of a class of organic structural directing agents (OSDA) composed of long-chain alkyl groups and two quaternary ammonium head groups spaced by a C6 alkyl linkage (C22-6-6). The bi-ammonium head group possibly plays a structure-directing role for the formation of the MFI crystal structure, while the long-chain alkyl tails possibly act as a surfactant favoring the formation of lamellar assemblies. ML-MFI can be exfoliated to obtain 2-dimensional zeolite MFI nanosheets. However, the strong van der Waals force among long-chain alkyl groups (C22) between the MFI layers hinders the exfoliation, greatly different from the case of typical layered materials such as clays, graphene, $MoS_2$, BN, and $WS_2$ etc., in which the layers are electrostatically bonded by weak van der Waals interactions or hydrogen bonds, allowing exfoliation methods such as solvation of interlayered cations, ultrasonic methods, stirring, and freeze-thawing method etc.

A polymer-melt-compounding technique to exfoliate layered zeolite precursors has also been reported. To achieve exfoliation, polystyrene (PS) was mixed with ML-MFI (or other layered zeolite) and melt-blended. Suspensions of exfoliated 2D MFI nanosheets were obtained after removing PS by washing the composite with toluene followed by redispersion in octanol. It is believed that this is currently the only method that can provide high purity 2D MFI zeolite nanosheets suspensions. However, the polymer-melt-compounding technique tends to damage and fragment nanosheets into smaller pieces (~200 nm basal dimensions) and is a multi-step time-consuming and low-yield process. Moreover, the obtained MFI nanosheets are hydrophobic and can be dispersed in non-polar solvents like toluene and octanol but not in water, which is desirable because it may enable layer-by-layer deposition methods for thin film and nanocomposite formation.

Treatment with acid has been demonstrated to remove some of the SDA and may allow dispersion of the nanosheets in ethanol. However, the acid extraction process only partially removed the OSDA molecules. Even for exfoliated MFI nanosheets, OSDAs were still present and the partially detemplated nanosheets could not be dispersed in water. Moreover, the pores of the MFI framework remain occupied by OSDA (as indicated by the absence of microporosity probed by standard porosimetry methods like cryogenic Ar-adsorption) prohibiting their use as a molecular sieve without further treatment for OSDA removal.

SUMMARY

Several challenges exist for significantly expanding the usefulness of 2D zeolites. For example, liquid phase exfoliation (i.e., without the need for melt-blending with a polymer) is desirable to enable simpler processing, higher yield and higher aspect ratio 2D zeolite nanosheets. Aqueous dispersions of nanosheets are also desirable to enable layer-by-layer and other water-based deposition and processing methods. Finally, OSDA-free nanosheets (e.g., 2D zeolite nanosheets with fully open and accessible micropores running along the thin dimension of the nanosheet) are desirable to enable their direct use in membranes.

In principle, the interaction between ML-MFI layers would be diminished after removing the long C22 hydrocarbon tails and exfoliation would be facilitated. However, the removal of the surfactant OSDA (also called detemplation) in 2D MFI zeolite without condensation of the lamellar structure is a great challenge. Detemplation by conventional calcination can result in the layers condensing topotactically to form a three-dimensional (3D) framework structure or randomly to form aggregates while, as mentioned above, the acid extraction process only partially removed OSDA.

Accordingly, large lateral size (e.g., up to 1000 nm in lateral dimension) zeolite nanosheets with open microporosity (OSDA molecules removed from the pores) and methods for their preparation are disclosed. The organic-free zeolite nanosheets can be dispersed in water, preparing an aqueous suspension of zeolite nanosheets in the absence of substantially any organic material. The removal of organic molecules from the micropores may be achieved by wet detemplation of multi-lamellar zeolite by using piranha solution (i.e., a mixture of $H_2SO_4$ and $H_2O_2$) as strong oxidizing solution.

Conventionally, zeolite nanosheets with OSDA do not show any pore accessibility since the pores are blocked by OSDA molecules, resulting in the absence of molecular sieve property. OSDA removal by calcination makes zeolite nanosheets condensed together and can barely be redispersed in solution. The inventors have discovered that by using a strong oxidizing solution such as piranha solution (a mixture of $H_2SO_4$ and $H_2O_2$), OSDA in layered zeolite can be removed in a solution. OSDA-free zeolite nanosheets can be used for the direct fabrication of zeolite membrane. Moreover, the hydrophilic zeolite nanosheets can be well dispersed in polar solvents such as water, which may be beneficial from aspects of cost and coating applications (e.g., using layer-by-layer deposition).

Using these detemplated nanosheets, molecular sieve membranes may be fabricated by simple filtration on a porous polymer support, for example.

Among other advantages, zeolite nanosheets formed using the disclosed methods include pore-opened zeolite nanosheets with high microporosity, which are hydrophilic, so they can be dispersed in water.

In general, in a first aspect, a method includes exposing a multi-lamellar (ML) zeolite material including an organic structure directing agent (OSDA) to a mixture including sulfuric acid and hydrogen peroxide under conditions sufficient to remove substantially all of the OSDA from the ML zeolite material; and after exposing the ML zeolite material, treating a solution containing the ML zeolite material to sonication and/or mixing under conditions sufficient to substantially exfoliate layers of the ML zeolite to obtain porous two-dimensional zeolite nanosheets that are substantially free of the OSDA.

In general, in a second aspect, a method includes exposing a zeolite nanosheet material including an organic structure directing agent (OSDA) to a mixture including sulfuric acid and hydrogen peroxide under conditions sufficient to remove substantially all of the OSDA from the zeolite nanosheet material; and after exposing the zeolite nanosheet material, dispersing it in a polar solvent.

Implementations of the methods may include one or more of the following features.

The ML zeolite material can include an MFI zeolite or an MWW zeolite (zeolite having a framework type MWW).

The mixture can include at least 2.5 parts sulfuric acid to 1 part hydrogen peroxide by volume (e.g., at least 3 parts, at least 4 parts, at least 5 parts, at least 6 parts). The mixture can include no more than 7 parts sulfuric acid to 1 part hydrogen peroxide by volume (e.g., no more than 6 parts, no more than 5 parts).

Exposing the ML zeolite material can include providing the ML zeolite material in the sulfuric acid and adding the hydrogen peroxide to the sulfuric acid or by preparing a mixture of sulfuric acid and hydrogen peroxide and adding the ML zeolite to the mixture.

In some embodiments, the method includes synthesizing the ML zeolite material using the OSDA prior to exposing the ML zeolite material.

The ML zeolite material may be exposed to the mixture for a time sufficient to remove the OSDA to a desired level (e.g., to about 5% or less, about 4% or less, about 3% or less, about 2% or less, about 1% or less, about 0.5% or less, as determined by thermogravimetric analysis).

The ML zeolite material may be exposed to mixtures comprising sulfuric acid and hydrogen peroxide multiple times to remove substantially all of the OSDA from the ML zeolite material. The sonication or mixing may be performed by a technique selected from the group consisting of bath sonication, horn sonication, vortexing, and shaking including combinations of them. The solution containing the ML zeolite material can be an aqueous solution.

In another aspect, a method of forming a zeolite membrane includes obtaining porous two-dimensional zeolite nanosheets using a method of the above-mentioned aspects, and forming the zeolite membrane using the porous two-dimensional zeolite nanosheets.

The polar solvent can be water.

The method can include, prior to exposing the zeolite nanosheet material to the mixture, exfoliating a ML zeolite material to provide the zeolite nanosheet material. The ML zeolite material can be exfoliated by melt blending.

In another aspect, a method of forming a zeolite membrane includes obtaining porous two-dimensional zeolite nanosheets using the above methods and forming the zeolite membrane using the porous two-dimensional zeolite nanosheets.

In general, in a further aspect, an aqueous solution of porous two-dimensional zeolite nanosheets that are substantially free of any organic structure directing agent (OSDA). The zeolite nanosheets can have a thickness of about 10 nm or less (e.g., about 9 nm or less, about 8 nm or less, about 7 nm or less, about 6 nm or less, about 5 nm or less, about 4 nm or less, such as about 3.5 nm). The zeolite nanosheets can have a lateral dimension of about 100 nm or more (e.g., about 200 nm or more, about 300 nm or more, about 400 nm or more, about 500 nm or more, about 600 nm or more, about 700 nm or more, about 800 nm or more, about 900 nm or more, such as about 1 micron or more). The lateral dimension may be less than about 5 microns (e.g., about 4 microns or less, about 3 microns or less, about 2 microns or less). The zeolite nanosheets can be MFI zeolite nanosheets or MWW zeolite nanosheets.

In general, in a further aspect, a zeolite membrane includes a porous two-dimensional zeolite nanosheet substantially free of any organic structure directing agent and a substrate supporting the porous 2D zeolite nanosheet. The zeolite nanosheets can have a thickness of about 10 nm or less (e.g., about 9 nm or less, about 8 nm or less, about 7 nm or less, about 6 nm or less, about 5 nm or less, about 4 nm or less, such as about 3.5 nm). The zeolite nanosheets can have a lateral dimension of about 100 nm or more (e.g., about 200 nm or more, about 300 nm or more, about 400 nm or more, about 500 nm or more, about 600 nm or more, about 700 nm or more, about 800 nm or more, about 900 nm or more, such as about 1 micron or more). The lateral dimension may be less than about 5 microns (e.g., about 4 microns or less, about 3 microns or less, about 2 microns or less).

The substrate can be a porous or non-porous substrate. The substrate can be an organic or inorganic substrate.

BRIEF DESCRIPTION OF THE DRAWINGS

FIG. 2 shows small-angle (A) and wide-angle (B) powder X-ray diffraction (XRD) patterns of (a) as-made ML-MFI (synthesized from a gel with composition of $100SiO_2:10SDA:24NaOH:18Na_2SO_4:400EtOH:4000H_2O$ hydrothermally treated at 140° C. for 7 d), (b) ML-MFI after horn sonication, and (c) ML-MFI sample after 3-times piranha treatment (5 hour at room temperature, followed by two 24 hour-treatments at 80° C.).

FIG. 8A shows AFM image of nanosheets deposited on silicon substrate using drop-coating method.

FIG. 8B shows height profiles along the profile lines shown in FIG. 8A.

FIG. 8C shows a low magnification transmission electron microscope (TEM) image of nanosheets.

FIG. 8D shows a high magnification TEM image of the nanosheets shown in FIG. 8C.

FIG. 14 is an SEM image of a sample after four times repeated piranha solution treatment at 80° C. for 1 day. The image is taken from the solid collected at the bottom of a centrifuge tube after centrifugation of the piranha solution treated suspension.

FIG. 16A-16B show photographs of self-standing disc composed of OSDA-free nanosheets (diameter is approximately 2 cm). FIG. 16A shows a top view image of the disc on a surface marked with "M." FIG. 16B shows a cross-section SEM image of the disc showing a thickness of approximately 3.5 μm.

FIGS. 20A and 20B show top view SEM images of a porous polyimide support before (FIG. 20A) and after (FIG. 20B) filtration of water suspension of OSDA-free MFI nanosheets.

DETAILED DESCRIPTION

Figure 1:
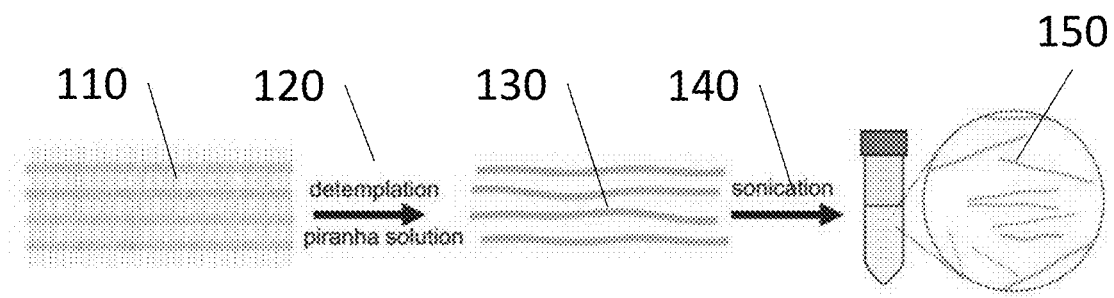
FIG. 1 is a schematic of the exfoliation of the multi-lamellar (ML) zeolites through detemplation followed by sonication.

Referring to FIG. 1, solution-based methods to exfoliate multi-lamellar (ML) zeolites based on a detemplation-sonication sequence are disclosed. In a first step, a ML zeolite material (110) that includes an OSDA is first treated with a mixture of concentrated sulfuric acid and hydrogen peroxide (known as "piranha solution") to remove the OSDA (120). The wet oxidation in a strong acid may avoid the condensation of nanosheets, which is dominant when detemplation takes place by calcination.

Afterwards, the OSDA-free zeolite (130) is placed in a suspension, which is treated with sonication (140) to obtain exfoliated 2D nanosheets (e.g., 1.5 unit-cell-thick) with basal size up to 1 μm (150) or more. Different from the polymer-melt-compounding technique, the detemplation-sonication method provides MFI nanosheets that are hydrophilic and can be dispersed in water.

A variety of techniques can be used to synthesize ML zeolites. Exemplary synthesis techniques for ML silicalite-1 zeolites are described by M. Choi et al., Nature 2009, 461, 246, K. Varoon et al., Science 2011, 334, 72, and W. Park et al., Chem. Mater. 2011, 23, 5131, for example. In an exemplary synthesis technique used for the MFI examples described below, diquaternary ammonium surfactant $[C_{22}H_{45}—N^+(CH_3)_2—C_6H_{12}—N^+(CH_3)_2—C_6H_{13}](Br_2)$ ($C_{22-6-6}Br_2$) was used as structural directing agent (SDA). $C_{22-6-6}Br_2$ was synthesized by alkylation of N,N,N',N'-tetramethyl-1,6-hexanediamine with 1-bromodocosane at 65° C. overnight followed by alkylation of the resultant product by 1-bromohexane at 85° C. overnight. For the synthesis of multi-lamellar silicalite-1, tetraethyl orthosilicate (TEOS) was hydrolyzed in the presence of OSDA, sodium hydroxide (NaOH), sulfuric acid ($H_2SO_4$) and deionized water to obtain a gel composition of $100SiO_2$:10SDA:24NaOH:$18Na_2SO_4$: 400EtOH:$4000H_2O$ or $100SiO_2$:7.5SDA:24NaOH:$18Na_2SO_4$:400EtOH:$4000H_2O$. After hydrolysis for 24 hours at room temperature, the resultant gel was crystallized in a rotating Teflon-lined steel autoclave at 140° C. for 7 days or 150° C. for 7 days (for the latter gel composition). The product was obtained by centrifugation. The cake was washed with deionized water and dried at 80° C. overnight.

More generally, the methods can be applied to other ML zeolites in addition to MFI zeolites. For example, the use of piranha detemplation for the removal of OSDA can also be applied to other ML zeolites such as the layered precursor to the MWW framework, known as MCM-22(P), as described below.

Removal of the OSDA from the ML zeolite material is achieved by oxidizing solution treatment using piranha solution. In some embodiments, the ML zeolite material is added to concentrated sulfuric acid (e.g., >90%). Then, hydrogen peroxide is added (e.g., dropwise) to the sulfuric acid. The ratio of sulfuric acid to hydrogen peroxide can vary. The ratio can be, for example as low as about 2.5:1 (sulfuric acid:hydrogen peroxide, by volume) up to about 7:1.

Exposure to piranha solution may be for several hours or more (e.g., 1 day, 2 days, 3 days or more) and may be repeated (e.g., 2, 3, 4, or more times).

After removal of the OSDA, the resulting cake may be washed (e.g., in water) and dried or kept in solution for the sonication step.

In an exemplary procedure, 0.1 g of the as-synthesized ML-MFI zeolite powder was mixed with 12 mL concentrated sulfuric acid (95~98%, Sigma-Aldrich) in a 50 mL Pyrex® glass bottle. After magnetically stirred for 0.5 h, 4 mL hydrogen peroxide (30%, Fisher Scientific) was dropwise added to the above suspension in a hood (the container was very hot due to generation of heat!). The suspension was stirred for another 1 h. During the stir period, the Pyrex® glass bottle was vented occasionally. Then the Pyrex® glass bottle was sealed in a secondary container and put in an 80° C. oven for 24 h at a specially designated area with appropriate safety precautions and limited access to other lab members to digest the organic species. After the secondary container and the Pyrex® glass bottle were completely cooled down, the Pyrex® glass bottle was opened carefully in a hood. The suspension was transferred to 50 mL polytetrafluoroethylene (PTFE) centrifuge tubes and centrifuged (Beckman Coulter, Model: Avanti J-20 XP equipped with JA25.50 rotor) at 40,000 g for 1 hour to recover the solid. The resulting cake was dispersed in approximately 50 mL DI water and the suspension was centrifuged at 40,000 g for 1 hour and the supernatant was discarded. The washing step was repeated until the pH of supernant was between 6~7. The final cake was dried at 70° C. overnight to get powder or just kept in wet cake form for next processing.

In general, a variety of treatment techniques can be used for exfoliation of detemplated nanosheets. In particular, four different types of treatment (vortexing, shaking, horn sonication, and bath sonication) were assessed for their ability to lead to exfoliation of the detemplated nanosheets. As shown in FIGS. 15A-15D, which show SEM images of single layer nanosheets, all four treatments produced MFI single layer nanosheets.

For example, referring to the example described above, the recovered wet cake was redispersed in 30 mL deionized (DI) water or dimethyl sulfoxide (DMSO). The above suspension was sonicated by an ultrasonicator (Bransonic Ultrasonic cleaner, 1210) for 90 min.

Horn sonication was also used. The wet cake after piranha solution treatment was redispersed in 30 mL DI water. The formed suspension was treated by a horn sonicator (Qsonica Q500, 500 watts, ¼" micro-tip) for 10 min under the setting of 40% output intensity and 2 sec of pause for each 5 sec sonication sequence. The suspension was cooled in an ice bath to avoid getting hot during the horn sonication.

Other mechanical mixing methods were also used, specifically vortexing and shaking. For example, 30 mL DI water suspension was stirred by vortexing (Fisher Scientific vortex mixer) at ~2500 rpm for 10 min and repeated 3 times. In another implementation, a 50 mL capped vessel with 30 mL DI water suspension was loaded on a rotation unit for shaking treatment with a rotation speed of about 10 rpm for 12 h.

Without wishing to be bound by theory, it is believed that the interaction between the long-chain tails of OSDA directs the compact stacking of zeolite layers to form ordered multi-lamellar structure. As shown by the XRD patterns for MFI zeolite layers, for example, in FIG. 2 (traces a and b), sonication-only does not alter significantly the multi-lamellar stacking. Mild acid treatments followed by sonication show similar outcomes. Accordingly, it is believed that oxidizing agents stronger than mild acids are necessary to remove organic residues. The so-called piranha solution is known as one of the strongest oxidizing agents and was used to decompose the OSDA in ML-MFI.

Figure 2:
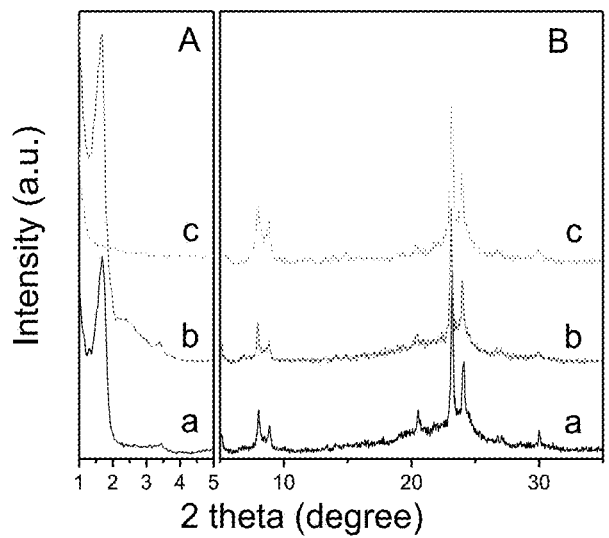
FIG. 2 shows X-ray diffraction patterns of as-made ML-MFI zeolites. Specifically.

Indeed, after repeatedly treating by piranha solution, the ML-MFI sample presents vanishing low-angle XRD peaks, yet well-resolved MFI-peaks in the wide-angle region, suggesting less ordered stacking (see FIG. 2, trace c in particular, where suppression of the peaks from 00 to 20 relative to traces a and b is clear). The powder XRD measurements were carried out using a Bruker-AXS (Siemens) D5005 diffractometer with a CuKα (λ=0.15406 nm) radiation source with a step of 0.04° and dwell time of 1 second.

Figure 3A:
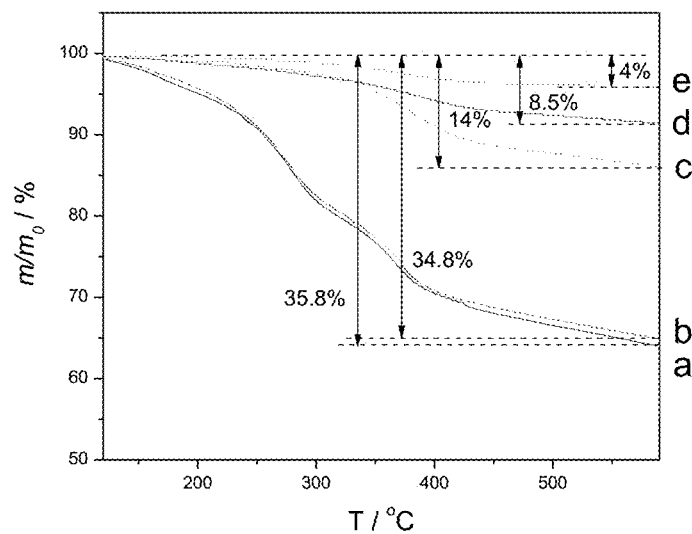
FIG. 3A shows thermogravimetric analysis (TGA) curves of (a) the as-synthesized ML-MFI (gel composition of $100SiO_2:10SDA:24NaOH: 18Na_2SO_4:400EtOH:4000H_2O$; hydrothermally treated at 140° C. for 7 d); (b) the as-synthesized ML-MFI after horn sonication treatment: 40% amplitude, 10 min with 2 sec of pause for each 5 sec sonication; (c) sample after piranha solution treatment at room temperature for 5 hours; (d) sample c after a second piranha solution treatment at 80° C. for 1 day; and (e) sample d after a third piranha solution treatment at 80° C. for 1 day.
Figure 3B:
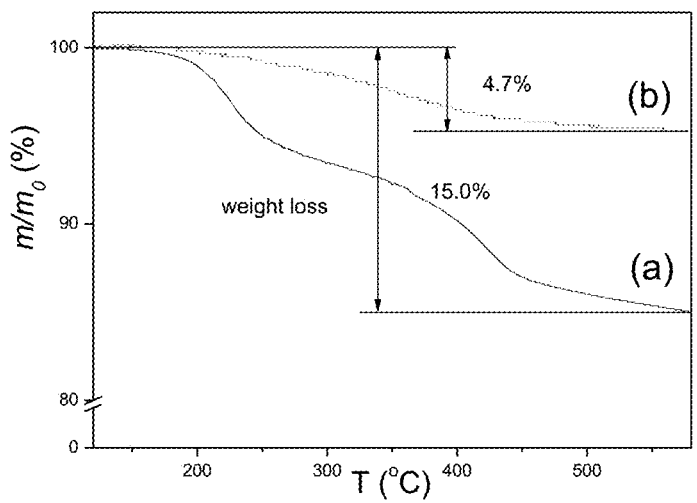
FIG. 3B shows TGA curves of MWW zeolites before (a) and after piranha solution treatment at 80° C. for 1 day (b).
Figure 3C:
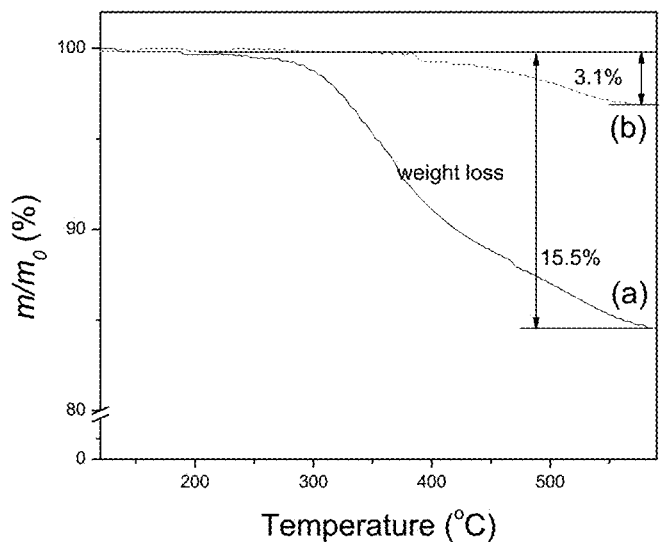
FIG. 3C shows TGA curves of as-synthesized silica self-pillared pentasil (Si-SPP) zeolites before (a) and after piranha solution treatment at 80° C. for 24 hours with total treatment of two times (b).

Referring to FIGS. 3A-3C, thermogravimetric analysis (TGA) indicates that the weight loss (in the 120~700° C. range) may be decreased from ~35% to 14% after the as-synthesized ML-MFI zeolite is treated by piranha solution at room temperature for 5 hours (compare traces a and b to trace c). The weight loss further decreased to 8.5% (trace d) when the above as-obtained powder was treated by piranha solution for a second time under more harsh conditions (80° C. for 1 day) and ultimately to 4.0% (trace e) for a third treatment under the same conditions.

Here, thermogravimetric analysis (TGA) was performed using a Shimadzu TGA-50 analyzer. Analysis was carried out by heating about 6 mg of the samples in air flow (100 mL/min) from 100 to 750° C. at a heating ramp rate of 10° C./min.

Figure 4A:
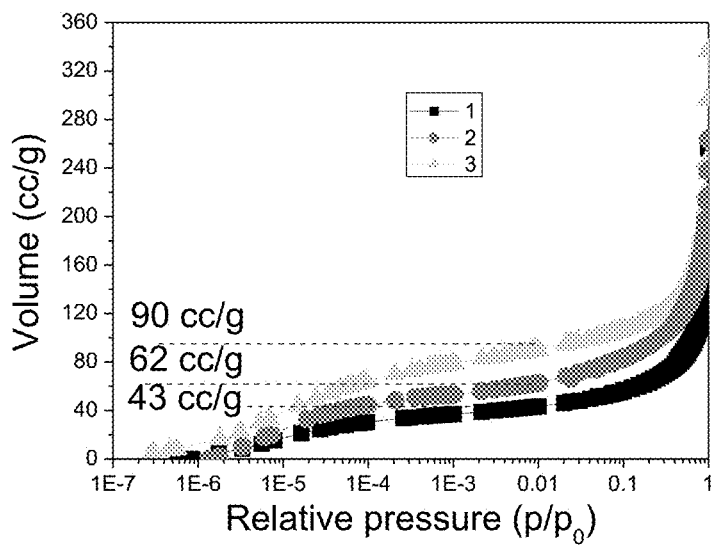
FIG. 4A shows 87 K Argon adsorption isotherms of (1) an ML-MFI sample after piranha solution treatment at r.t. for 5 h and a second piranha solution treatment at 80° C. for 1 day; (2) sample in (1) after a third piranha solution treatment at 80° C. for 1 d; (3) as-synthesized ML-MFI used in (1) after calcination at 550° C. for 5 h.
Figure 4B:
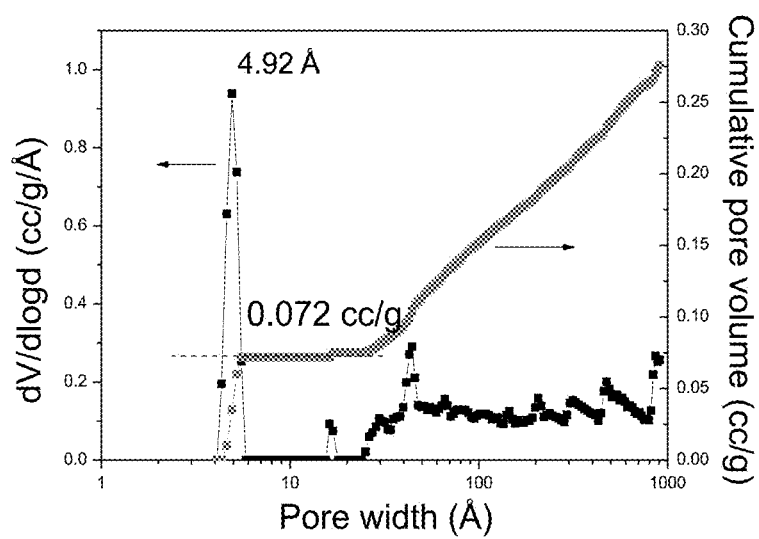
FIG. 4B shows Nonlocal density functional theory (NLDFT) pore size distributions of the sample shown in FIG. 4A (1). Density functional theory (DFT) Calculation Model: Ar at 87 K zeolites/silica (cylinder pores, NLDFT)
Figure 4C:
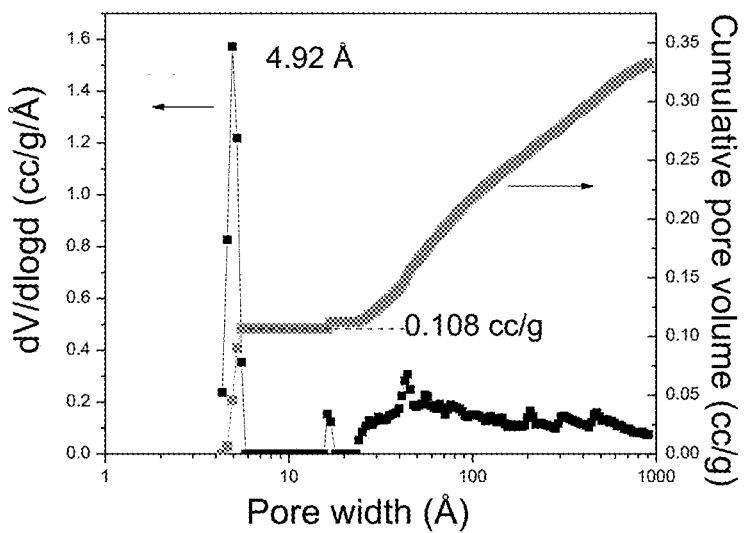
FIG. 4C shows NLDFT pore size distributions of the sample shown in FIG. 4A (2). DFT Calculation Model: Ar at 87 K zeolites/silica (cylinder pores, NLDFT)
Figure 4D:
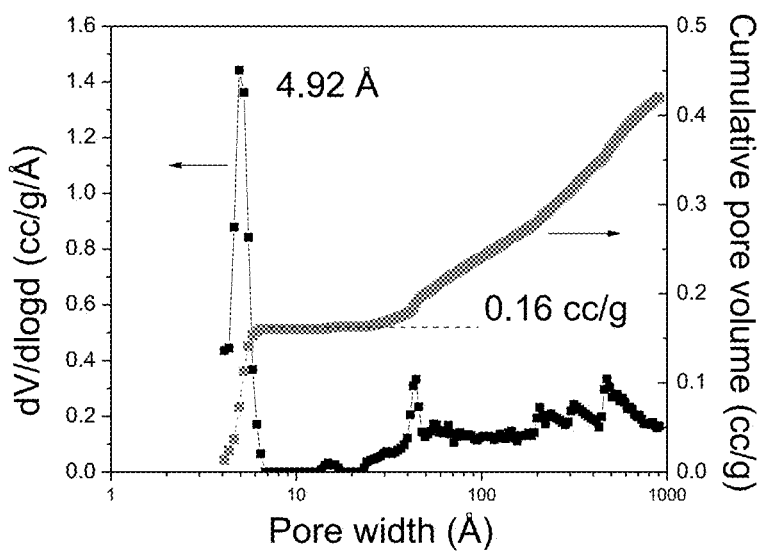
FIG. 4D shows NLDFT pore size distributions of the sample shown in FIG. 4A (3). DFT Calculation Model: Ar at 87 K zeolites/silica (cylinder pores, NLDFT)

Referring to FIGS. 4A and 4B, argon adsorption shows 40 cc/g and 53 cc/g for the sample with weight loss of 8.5% and 4.0%, respectively. These results suggest that most of the organic species were removed and more than half of the micropores (~90 cc/g for the same sample calcined at 550° C.) were opened after the repeated piranha solution treatment. Methods for sample 1-3 are described in FIGS. 4A and 4B captions.

TABLE 1

Porosity of the ML-MFI after treatment, derived from Ar adsorption isotherms in FIGS. 4A-4D.

| Sample | $S_{BET}$ (M²/g) | $S_{exter}$ (m²/g) | $S_{micro}$ (m²/g) | $V_{total}$ (cc/g) | $V_{micro}$ (cc/g)$^a$ |
|---|---|---|---|---|---|
| 1 | 198 | 131 | 65 | 0.33 | 0.023 |
| 2 | 296 | 174 | 122 | 0.33 | 0.043 |
| 3 | 372 | 173 | 199 | 0.43 | 0.072 |

Argon adsorption-desorption isotherms were obtained using a Quantachrome Autosorb-iQ instrument at 87 K. Samples were degassed at 120° C. for 12 hours under vacuum prior to the analysis. The pore size distributions were obtained from the adsorption branch of the isotherms using the nonlocal density functional theory (NLDFT) method (Quantachrome software, AsiQwin V 3.01).

Figure 5A:
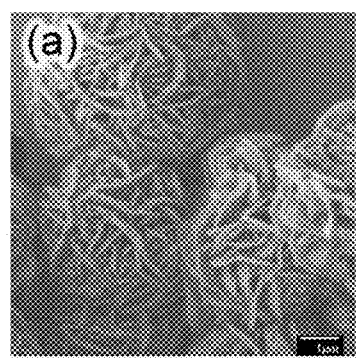
FIG. 5A shows a scanning electron microscope (SEM) image of the as-synthesized ML-MFI sample (gel composition of $100SiO_2:10SDA:24NaOH:18Na_2SO_4:400EtOH:4000H_2O$; hydrothermally treated at 140° C. for 7 d).
Figure 5B:
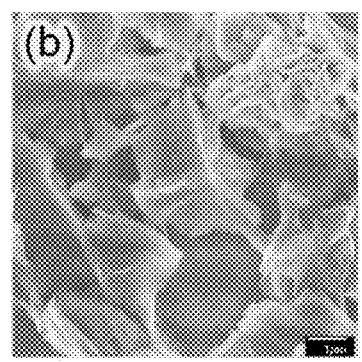
FIG. 5B shows an SEM image of the ML-MFI sample shown in FIG. 5A after treated by piranha solution for 3 times.
Figure 5C:
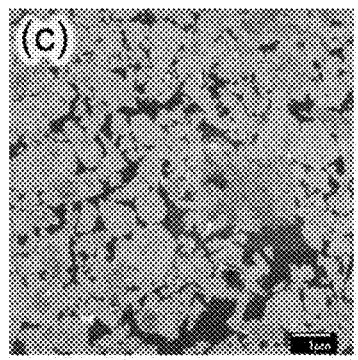
FIG. 5C shows an SEM image of MFI nanosheets coated on the silicon wafer.
Figure 5D:
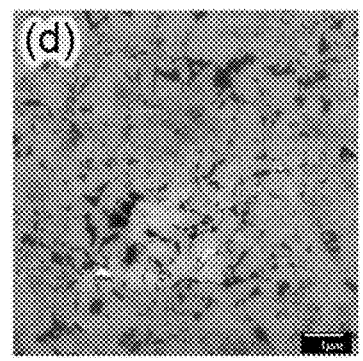
FIG. 5D shows an SEM image of calcined MFI nanosheets on silicon wafer at 400° C. for 4 hours.

Referring to FIGS. 5A-5D, SEM images show that the morphology of ML-MFI changes from spherical assemblies consisting of intergrown multi-lamellar MFI sheets for the as-synthesized material (FIG. 5A) to few-layer MFI nanosheets after piranha solution treatment (FIG. 5B). The removal of the long-chain tails of OSDA results in wrinkling or curling of the flexible single MFI layers, which combined with the absence of low-angle XRD peaks indicates loose stacking—a beneficial outcome for the exfoliation attempt by sonication described next.

Figure 6A:
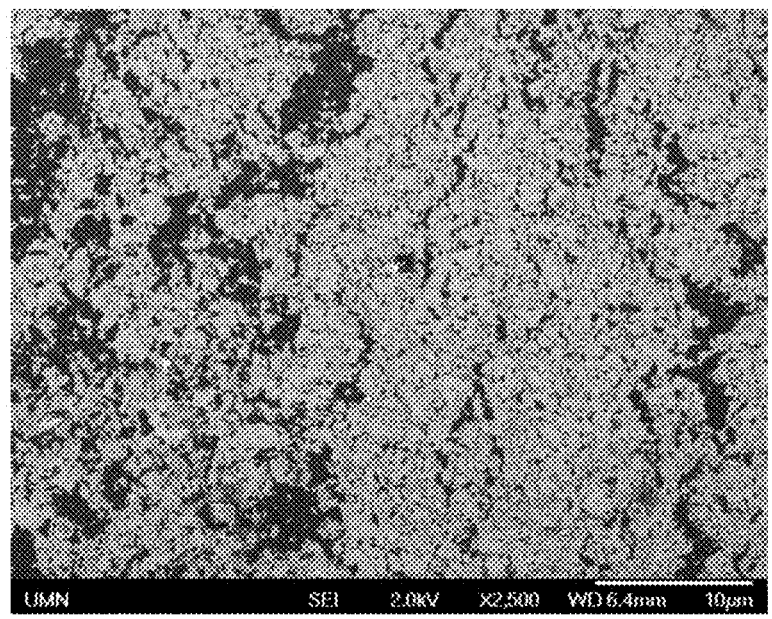
FIG. 6A shows a low magnification SEM image of MFI nanosheets on a silicon wafer.
Figure 6B:
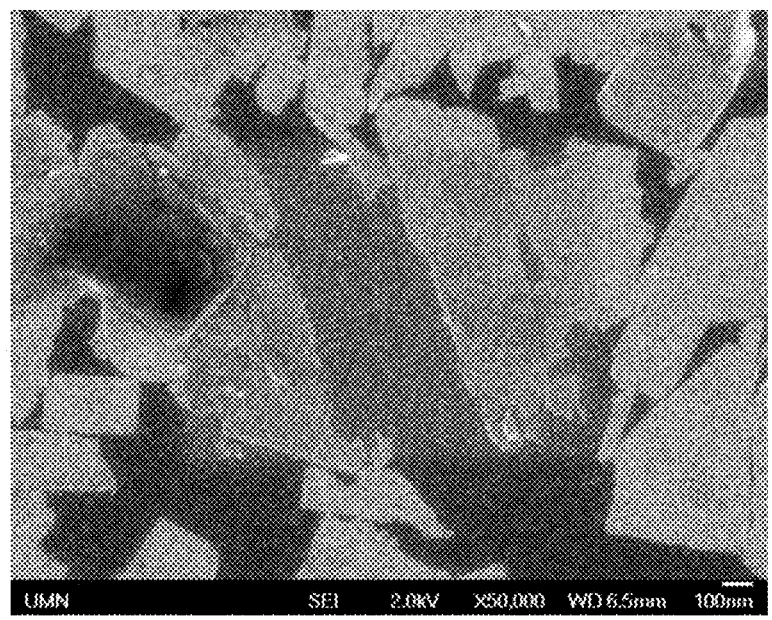
FIG. 6B shows a high magnification SEM image of the MFI nanosheets on the silicon wafer.
Figure 7:
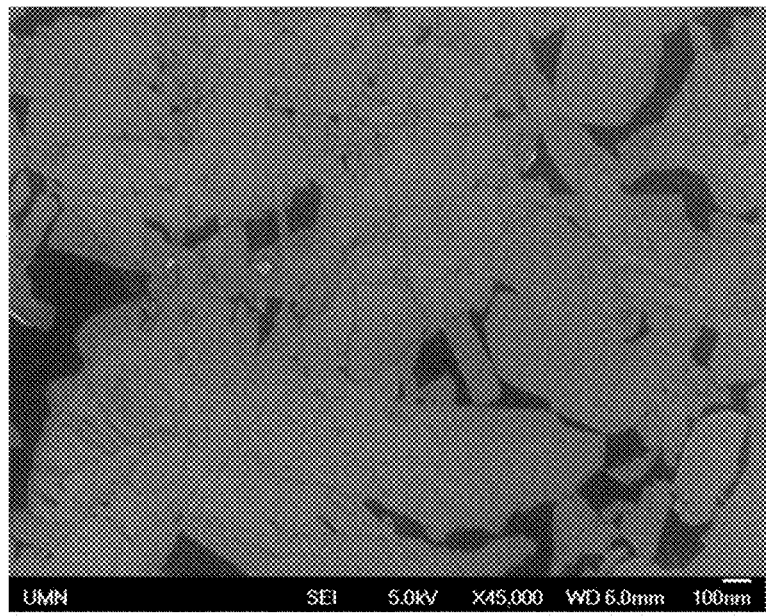
FIG. 7 shows a high magnification SEM image of MFI nanosheets on silicon wafer after calcination at 400° C. for 4 hours.

The piranha solution treated ML-MFI zeolite as a wet cake was redispersed in dimethylsulfoxide (DMSO) and treated with bath sonication for 90 min. The resultant suspension was centrifuged at 10,000 g for 10 min and the supernatant was collected, which was drop-coated on a silicon wafer for SEM observations. Single layer MFI nanosheets with uniform thickness are abundant on the silicon wafer substrate, illustrating the successful exfoliation of ML-MFI zeolite by the combined detemplation-sonication method. Isolated MFI nanosheets with plane view size (basal dimensions) as large as 1 μm are observed (FIG. 5C, for high magnification and wide view SEM images see FIGS. 6A and 6B). After calcination, the nanosheets maintain the original size and dispersion (FIG. 5D, for high magnification SEM image see FIG. 7).

Here, scanning electron microscopy (SEM) images were acquired using JEOL 6700 microscope operating at 5 kV in a secondary electron image (SEI) mode. Prior to the observations, the suspension was drop-coated on a silicon wafer, which was stuck on a platform by conductive tapes, and dried at room temperature.

Referring to FIGS. 8A-8D, the thickness of the nanosheets was confirmed by atomic force microscopy (AFM). As evident from FIG. 8A, most of the nanosheets exhibit same contrast, indicating uniform thickness, except for some dark spots attributed to the unexfoliated few-layer thick nanosheets. Line profiles across three chosen nanosheets are shown in FIG. 8B. The nanosheets at positions 1 or 2 are about 3.5 nm in thickness with flat surface, corresponding to a 2D monolayer (1.5 unit-cell-thick MFI along its b-axis). The thickness of the darker nanosheet at position 3 is about 7.0 nm and it can be attributed to a bilayer MFI nanosheet.

Atomic force microscopy (AFM) was carried out in tapping mode in the repulsive regime using a Bruker Nanoscope V Multimode 8 AFM. Analysis of AFM images was done using Gwiddion 2.31 software. In order to calibrate the AFM height data, freshly cleaved muscovite mica was etched in 50% hydrofluoric acid for 4 hours to produce 2.0 nm steps on mica. These steps were used as the calibration standard. For the preparation of AFM specimens, nanosheets suspension was drop-coated on a silicon wafer. The sample was calcined in air flow at 400° C. for 4 hours to remove the organics from the pores and surface of the nanosheets.

Transmission electron microscopy (TEM) images further confirm that the exfoliated nanosheets are of uniform thickness with MFI crystal structure (FIGS. 8C and 8D). At least one basal dimension of the nanosheets is larger than 800 nm. TEM was performed on a FEI Tecnai G2 F30 operating at 300 kV. TEM samples were prepared by drop-casting suspensions of nanosheets in water on TEM grids (ultrathin carbon film on holey carbon support film, 400 mesh Cu, Ted Pella). The grid was dried at room temperature and imaged.

Figure 9:
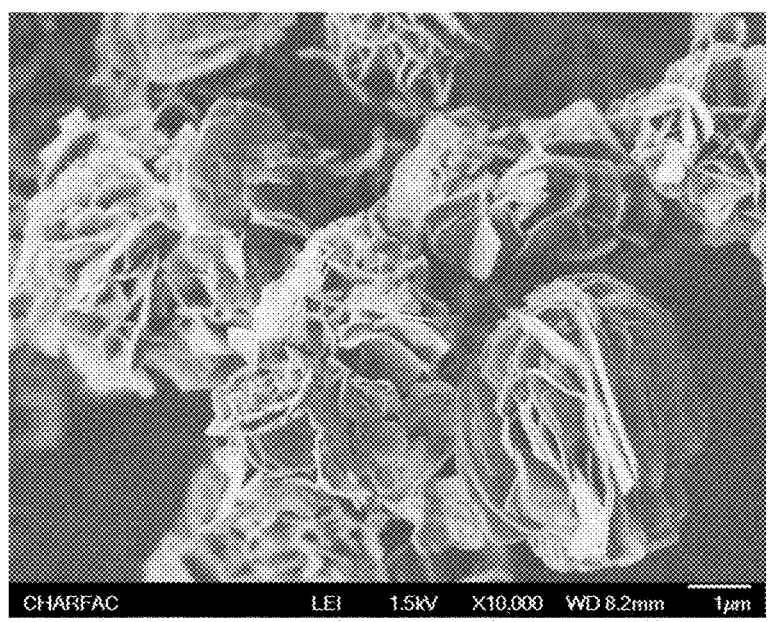
FIG. 9 shows an SEM image of an as-synthesized ML-MFI from a gel composition of $100SiO_2:7.5SDA:24NaOH:18Na_2SO_4:400EtOH:4000H_2O$, hydrothermally crystallized at 150° C. for 7 days.
Figure 10:
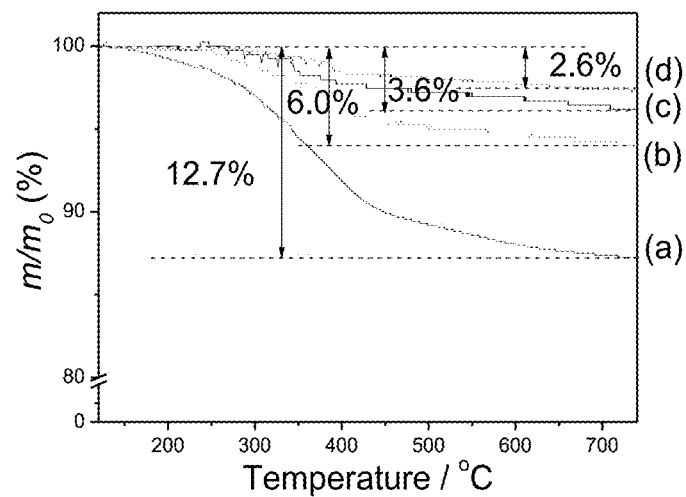
FIG. 10 shows thermogravimetry (TG) curves of ML-MFI zeolites after piranha solution treatments at 80° C. for 1 day repeated: (a) one, (b) two, (c) three, and (d) four times. The synthesis gel composition of the ML-MFI is $100SiO_2:7.5SDA:24NaOH:18Na_2SO_4:400EtOH:4000H_2O$ and crystallization was done at 150° C. for 7 days.

Nanosheets with even larger basal dimensions were obtained when ML-MFI with improved morphology (i.e., ML-MFI with larger particle size and reduced rotational intergrowths—see FIG. 9 for SEM image) was used as the starting material. After repeatedly treated by piranha solution for four times, this ML-MFI zeolite shows weight loss as low as 2.6% in the 120~700° C. range, indicating that improved OSDA removal yield to almost completion (see, FIG. 10).

Figure 11:
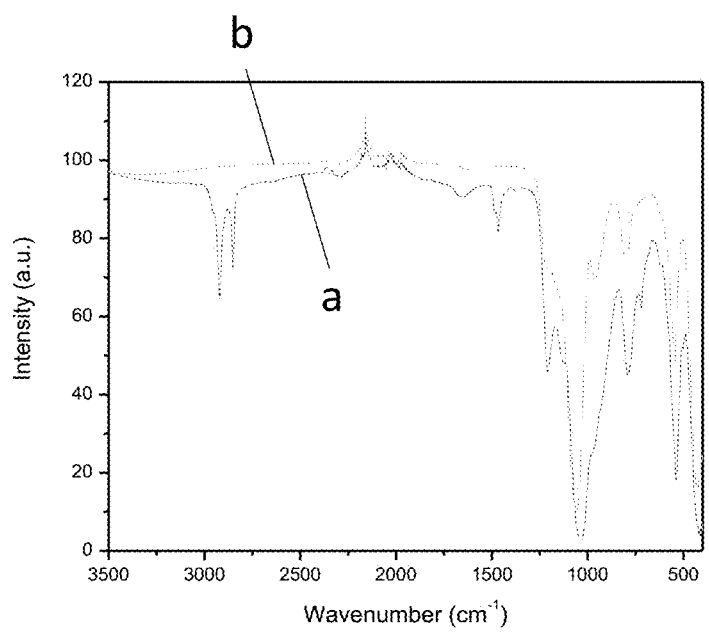
FIG. 11 shows attenuated total reflection Fourier transform infrared spectroscopy (ATR-FTIR) of as-synthesized (trace a) and detemplated (trace b) ML-MFI (gel composition of $100SiO_2:7.5SDA:24NaOH:18Na_2SO_4:400EtOH:4000H_2O$ crystallized at 150° C. for 7 days).
Figure 12:
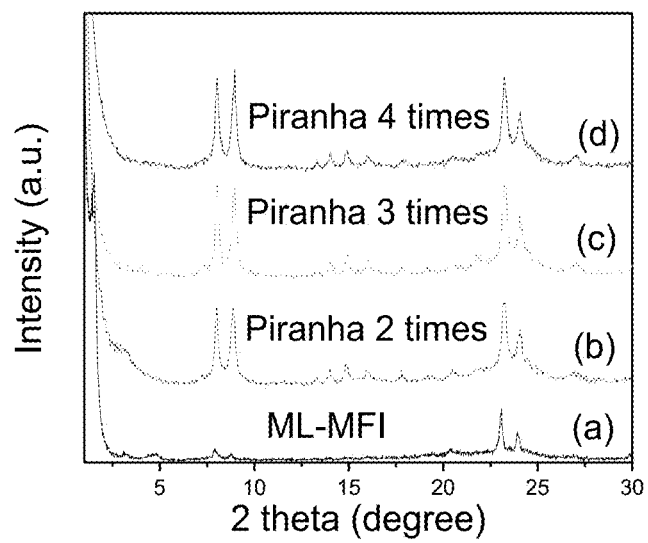
FIG. 12 shows XRD patterns of (a) as-synthesized ML-MFI, and (b) after piranha solution treatment at 80° C. for 1 day repeated two, (c) three, and (d) four times. The synthesis gel composition of the ML-MFI was $100SiO_2:7.5SDA:24NaOH:18Na_2SO_4:400EtOH:4000H_2O$ and crystallization was at 150° C. for 7 days.
Figure 13:
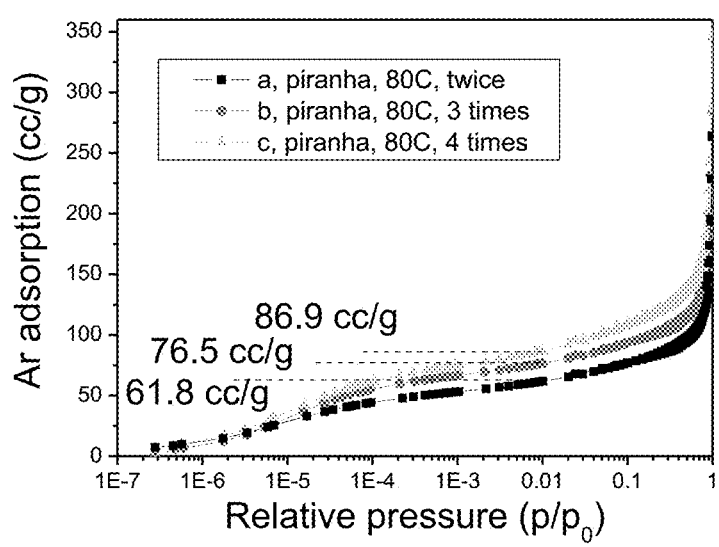
FIG. 13 shows 87K argon adsorption isotherms for ML-MFI zeolites after repeated piranha solution treatment at 80° C., 1 day for (a) twice, (b) three, and (c) four times. The synthesis gel composition of the ML-MFI was $100SiO_2:7.5SDA:24NaOH:18Na_2SO_4:400EtOH:4000H_2O$, crystallization at 150° C. for 7 days.

Fourier transform infrared (FTIR) also confirmed the absence of detectable levels of OSDA after four times piranha solution treatment (see, FIG. 11). The piranha solution treated samples at all stages preserve the MFI crystal structure, as confirmed by XRD (see, FIG. 12). For a four-times piranha treated ML-MFI at 80° C., Argon adsorption data correspond to DFT-calculated microporosity of 87 cc/g, with a nominal Brunauer-Emmett-Teller (BET) specific surface area of 376 m$^2$/g (see, FIG. 13), while SEM examination shows the presence of an aggregated nanosheet morphology (see, FIG. 14). FTIR spectra were recorded in attenuated total reflection (ATR) mode on a Thermo Scientific Nicolet iS50 FT-IR spectrometer equipped with a liquid nitrogen cooled MCT detector. The spectrometer was purged with dry air and the spectra were acquired in the range of 4000-650 cm$^{-1}$ and averaged over 16 scans. The data analysis was performed using Omnic software.

By way of further example, 0.1 g of the as-synthesized MCM-22(P) powder was dispersed in 12 mL concentrated sulfuric acid (95~98%) and stirred for 10 min. Then, 4 mL hydrogen peroxide (30%) was dropped into the above suspension (the container was very hot due to generation of heat!). The suspension was stirred for another 1 hour. Then the mixture was heated in an 80° C. oven for 24 hour at a specially designated area with appropriate safety precautions and limited access to other lab members to digest the organic species. After the mixture was completely cooled down, the suspension was centrifuged at 40,000 g for 6 hours to recover the solid. After the treatment, the cake was dispersed in 30 mL DI water. This aqueous suspension was sonicated in an ultrasonicator for 90 min, followed by horn sonication for 10 min under the setting of 40% output intensity. The suspension was cooled in an ice bath to avoid temperature rise during the horn sonication. MWW nanosheets ranging from 100 to 1000 nm were collected from the supernatant after the suspension was centrifuged at 10,000 g for 10 min.

The whole solid was recovered by centrifugation at 40,000 g for 6 hours and dried at 80° C. overnight to check the amount of OSDA in MWW zeolite. Referring to FIG. 3B, TGA curves show the OSDA amount was greatly reduced from 15% to 4.7% after piranha solution treatment at 80° C. for 24 hr.

Figure 18A:
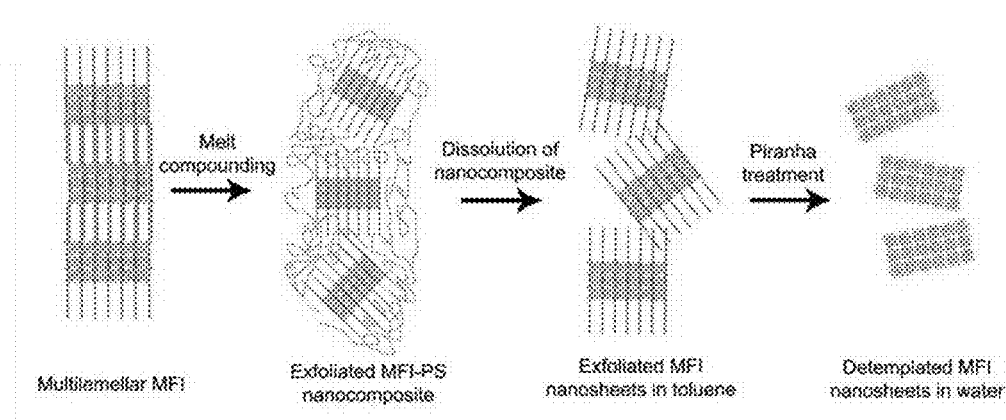
FIG. 18A is a schematic showing OSDA-free MFI nanosheets fabricated by the application of piranha solution treatment to exfoliated nanosheets (made, for example, using melt-blending ML-MFI with a polymer like polystyrene).

The use of piranha detemplation can also be used to remove the OSDA from nanosheets after exfoliation. FIG. 18A schematically illustrates an example of such detemplation. This method includes a melt-compounding step introduced before the piranha solution treatments. This step results in a composite material composed of an exfoliated, OSDA-containing zeolite material in a polymer phase. Methods of melt-blending exfoliation are described, for example, in "Zeolite Nanosheets Membrane" Tsapatsis M. and Agraval K. V., U.S. application Ser. No. 14/130,589.

Figure 18B:
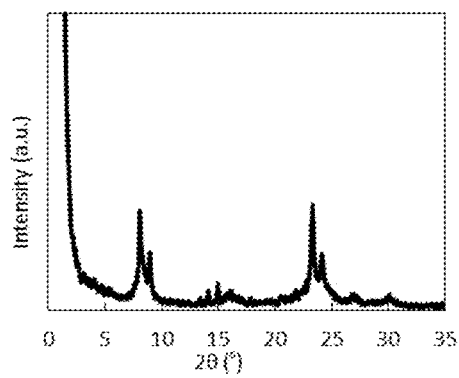
FIG. 18B is an XRD plot of the OSDA-free nanosheets after four-time piranha solution treatment.
Figure 18C:
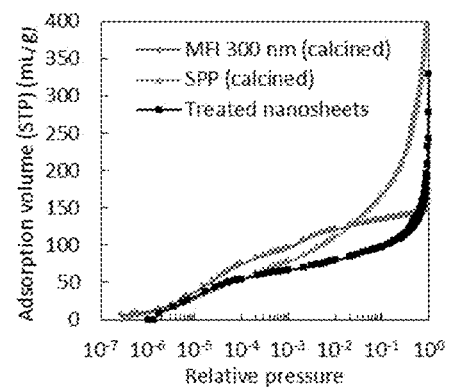
FIG. 18C is an argon adsorption isotherm plot of calcined 300 nm MFI particles, calcined self-pillared single unit cell MFI (SPP) particles, and exfoliated nanosheets treated four-time by piranha solution.
Figure 18D:
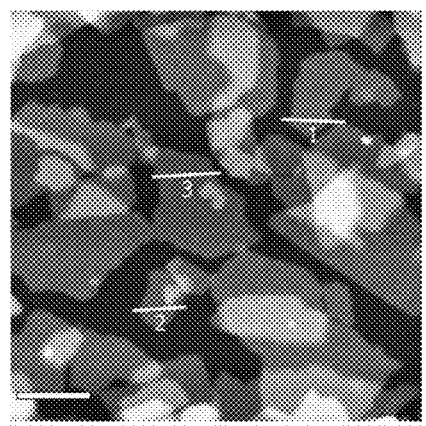
FIG. 18D is an AFM (tapping mode) topographical image of OSDA-free nanosheets (made by exfoliation followed by 4 times piranha solution treatment) coated on Si wafer by use of a Langmuir trough; scale bar is 200 nm.
Figure 18E:
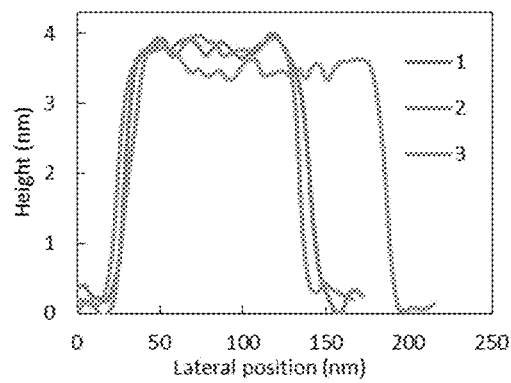
FIG. 18E is a plot of the height vs. length data along the lines highlighted in FIG. 18D.

Referring to FIGS. 18B-18E, in an exemplary implementation, this process was performed for ML-MFI samples. Specifically, ML-MFI samples were mixed with oligomer polystyrene (M$_w$~1300 g/mol) inside a melt-compounder and the obtained composite was dissolved in toluene and washed by repeated centrifugation to remove the PS oligomer. The cake of exfoliated nanosheets was further treated with piranha solution followed by washing and finally dispersed in DI water. The resulting nanosheets preserve the MFI crystallinity as confirmed by their XRD pattern (FIG. 18B). Argon adsorption measurements demonstrated micropore volume of 80 cc/g (adsorbed at P/P$_0$=0.01) (see, FIG. 18C). The thickness of the resulting nanosheets was 3.2 nm as confirmed by AFM (see, FIG. 18D), which is the typical 1.5 unit-cell-thickness of the single layer nanosheets from ML-MFI.

Figure 19A:
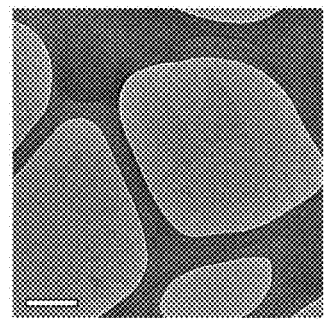
FIG. 19A is a TEM image of OSDA-free nanosheets obtained by melt compounding followed by piranha solution treatment. Scale bar is 200 nm.
Figure 19B:
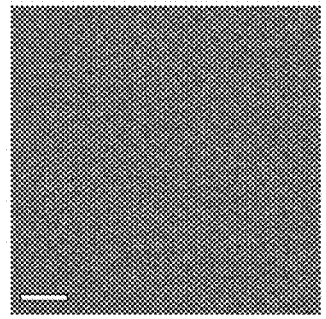
FIG. 19B is a high-resolution Weiner filtered TEM image of a single nanosheet shown in FIG. 19A. Scale bar is 10 nm.
Figure 19C:
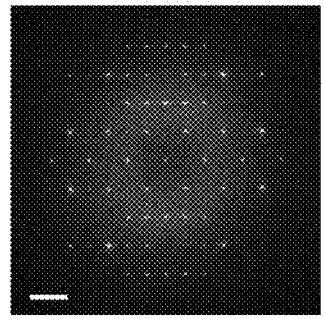
FIG. 19C is a Fast Fourier Transform (FFT) of the image shown in FIG. 19B showing spots typical of MFI crystal structure. Scale bar is 1 $nm^{-1}$.

Referring to FIGS. 19A-19C, TEM imaging and electron diffraction also confirmed the uniform thickness and MFI crystallinity after the treatment. Specifically, FIG. 19A shows a TEM image of exfoliated MFI nanosheets obtained by melt compounding followed by Piranha treatment. The scale bar is 200 nm. FIG. 19B shows a high-resolution Weiner filtered conventional electron microscope (CTEM) image of a single nanosheet from FIG. 19A. The scale bar here is 10 nm. FIG. 19C shows a Fast Fourier Transform (FFT) of the image shown in FIG. 19B showing spots typical of MFI crystal structure. The scale bar in FIG. 19A is 1 nm$^{-1}$.

In some embodiments, the piranha solution treatment can be used for the removal of OSDA of intergrown nanosheets in materials that are called self-pillared zeolites or hierarchical zeolites to replace calcination treatment. For example, the piranha solution treatment can be applied to the hierarchical zeolite material called self-pillared pentasil (SPP) as follows: 0.1 g of the as-synthesized Si-SPP powder was dispersed in 12 mL concentrated sulfuric acid (95~98%) and stirred for 10 min. Then, 4 mL hydrogen peroxide (30%) was dropped into the above suspension (the container was very hot due to generation of heat!). The suspension was stirred for another 1 h. Then the mixture was heated in an 80° C. oven for 24 h at a specially designated area with appropriate safety precautions and limited access to other lab members to digest the organic species. After the mixture was completely cooled down, the suspension was centrifuged at 40,000 g for 6 hours to recover the solid. The resulting cake was treated with piranha solution for one more time the same way as describe above. After the treatment, the cake was dispersed in 30 mL DI water. This aqueous suspension was sonicated in an ultrasonicator for 90 min, followed by horn sonication for 10 min under the setting of 40% output intensity. MFI nanosheets ranging from 100 to 500 nm were collected from the supernatant after the suspension was sedimented for 2 days.

The solid was recovered by centrifugation at 40,000 g for 6 hours and dried at 80° C. overnight to check the amount of OSDA in Si-SPP zeolite. Referring to FIG. 3C, thermogravimetry (TG) curves show the OSDA amount was greatly reduced from 15.5% to 3.1% after piranha solution treatment at 80° C. for 24 h with total treatment of two times.

Figure 15A:
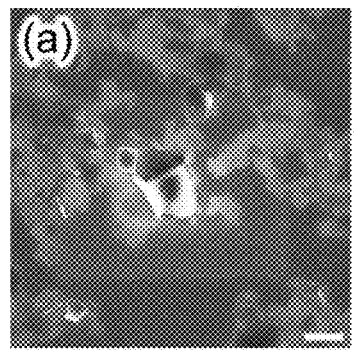
FIG. 15A shows an SEM image of MFI nanosheets dried from a water suspension prepared by detemplation of ML-MFI (gel composition $100SiO_2:7.5SDA:24NaOH:18Na_2SO_4:400EtOH:4000H_2O$; hydrothermally treated at 150° C. for 7 d) followed by vortexing for 10 min, repeated three times. Scale bar=1 μm.
Figure 15B:
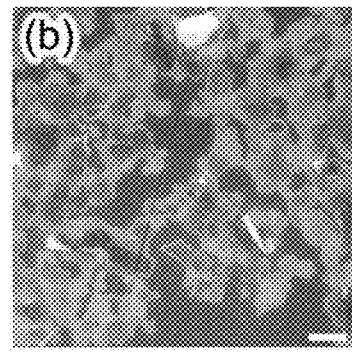
FIG. 15B shows an SEM image of the MFI nanosheets shown in FIG. 15A after shaking for 12 hours. Scale bar=1 μm.
Figure 15C:
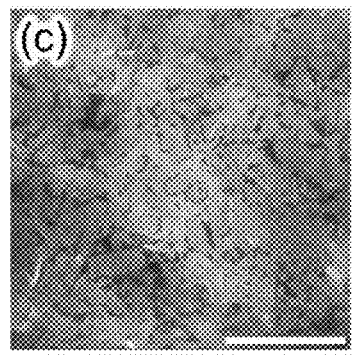
FIG. 15C shows an SEM image of the MFI nanosheets shown in FIG. 15B after horn sonication, 20% amplitude, 10 min. Scale bar=1 μm.
Figure 15D:
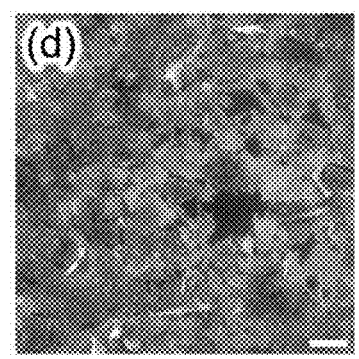
FIG. 15D shows an SEM image of the MFI nanosheets shown in FIG. 15C after bath sonication, 90 min. All the suspensions were sedimented for 3 days and then each supernatant was collected and drop-coated on a silicon wafer for SEM observation. Scale bar=1 μm.
Figure 15E:
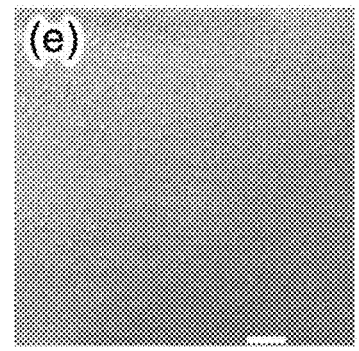
FIGS. 15E-15F show SEM images of a top view and a cross-sectional view, respectively, of the self-standing MFI film formed by drop-coating the MFI nanosheets on an alumina support. Scale bar=10 μm for FIG. 15E. Scale bar=1 μm for FIG. 15F.
Figure 15F:
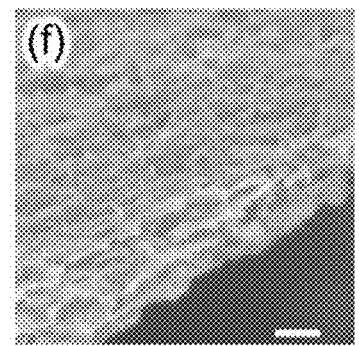
Figure 17A:
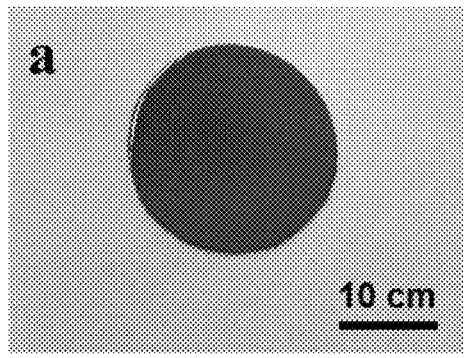
FIGS. 17A-17F show photographs and top view SEM images of a porous polybenzimidazole (PBI) support before (FIGS. 17A, 17C, and 17E) and after (FIGS. 17B, 17D, and 17F) filtration of water suspension of OSDA-free MFI nanosheets. Inset in FIG. 17E is a high magnification view of a portion of FIG. 17E; inset in FIG. 17F is a high magnification view of a portion of FIG. 17F.
Figure 17B:
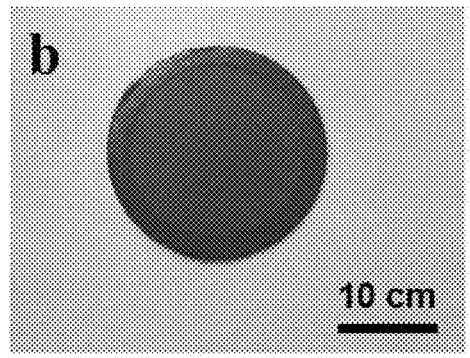
Figure 17C:
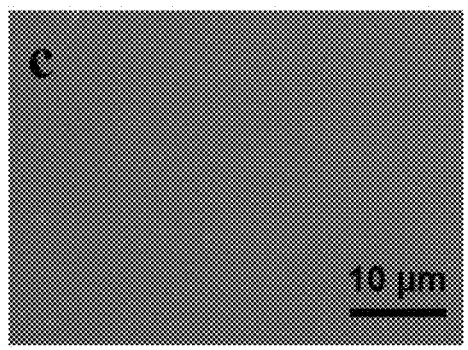
Figure 17D:
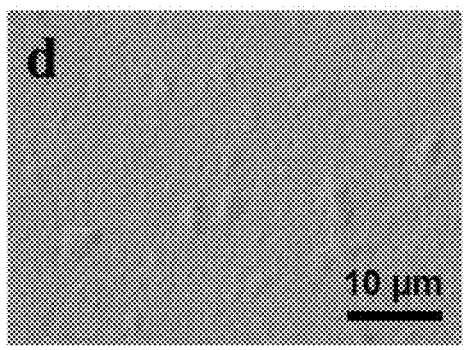
Figure 17E:
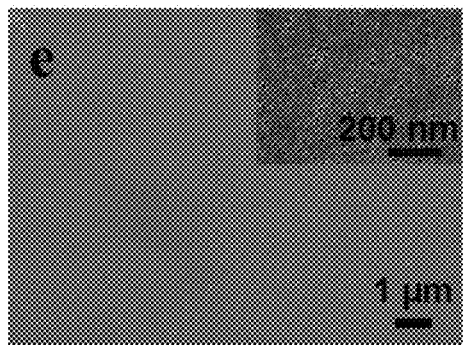
Figure 17F:
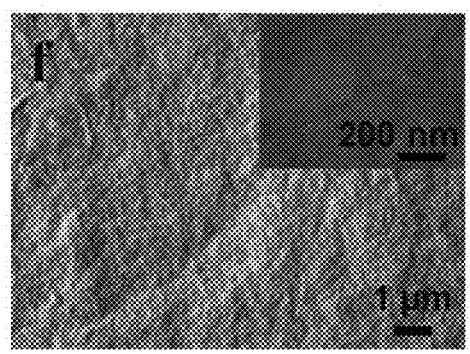

In general, the aqueous suspension containing OSDA-free exfoliated layers can be used in a variety of applications. In some embodiments, aqueous suspension containing OSDA-free exfoliated layers can be used to form self-standing and supported films. For example, when directly dropped on a porous alumina support (see, e.g., K. V. Agrawal, AIChE J. 2013, 59, 3458 describing exemplary techniques) and dried at 80° C., forms a transparent film that peels off from the alumina support (see, FIGS. 15E and 15F). As evident in FIG. 15E, the peeled off film is flat and cracked-free. From the cross-section view, one can see that the self-supported nanosheet film has thickness of about 1 μm (see, FIG. 15F). The hydrophilic MFI nanosheets adhered together sufficiently strongly while their interface with the support was rather weak due to the high and low concentration of —OH groups in the nanosheets and alumina support, respectively. A film that had been peeled off after depositing by filtration OSDA-free nanosheets on a porous polybenzimidole (PBI) support is shown in FIGS. 16A and 16B.

In some embodiments, films of the OSDA-free nanosheets are deposited on porous supports without peeling off. This can be achieved by treatment of the support to increase nanosheet-support adhesion. For silica and alumina supports, this can be achieved by piranha solution treatment to increase the surface hydrophilicity of the supports. For PBI support there can be good adhesion. FIGS. 17A-17F show photos and SEM images of porous PBI support before and after nanosheet deposition. A uniform and well-packed nanosheet coating can be formed completely covering the PBI support pores. The formed membrane without any further treatment (i.e., without secondary growth and calcination) exhibits membrane performance characteristic of MFI micropores with a n-butane over iso-butane selectivity of 5.4 as shown in Table 2.

TABLE 2 n-/i-Butane single gas ideal selectivity and permeance of the OSDA-free nanosheets coated on PBI porous support (room temperature and atmospheric pressure feed). Data from five different membranes are shown.

| Membrane | n-Butane permeance ($mol/m^2$-s-Pa) | Ideal selectivity |
|---|---|---|
| 1 | $3.7 \times 10^{-7}$ | 5.5 |
| 2 | $3.8 \times 10^{-7}$ | 5.5 |
| 3 | $3.5 \times 10^{-7}$ | 5.4 |
| 4 | $3.3 \times 10^{-7}$ | 5.4 |
| 5 | $3.2 \times 10^{-7}$ | 5.3 |
| Average | $(3.5 \pm 0.3) \times 10^{-7}$ | $5.4 \pm 0.1$ |

As an example, FIG. 20A shows a porous polyimide support. As shown in FIG. 20B, the OSDA free nanosheet deposit is stable and uniformly coated on the polyimide support without peeling-off. The formed membrane, without further treatment (e.g., without secondary growth and calcination), exhibits membrane performance characteristic of MFI micropores with a n-butane over iso-butane selectivity of 4.5 with n-butane permeance of $6.4 \times 10^{-7}$ $mol/m^2$-s-Pa.

Figure 21:
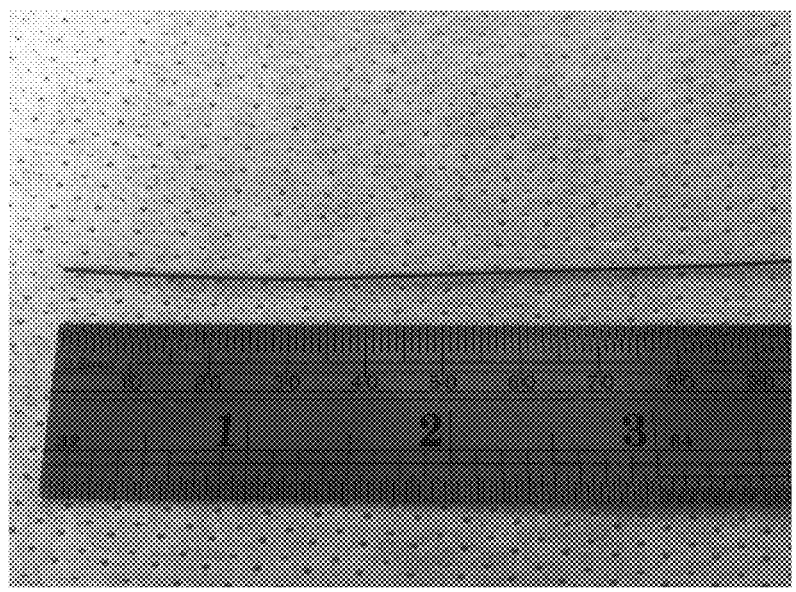
FIG. 21 shows a photograph of a porous PBI hollow fiber.

As another example, FIG. 21 shows an OSDA-free nanosheets deposited on porous PBI hollow fiber support. The thickness of the coating layer is controlled by the OSDA-free nanosheet concentration and the coating time. The deposit is stable and uniformly coated on the porous PBI hollow fiber support without peeling-off. The formed membrane, without further treatment (e.g., without secondary growth and calcination), exhibits membrane performance characteristic of MFI micropores with a n-butane over iso-butane selectivity of 2.9 with n-butane permeance of $2.7 \times 10^6$ $mol/m^2$-s-Pa.

Although the selectivity shown in Table 2 is about one order of magnitude smaller than that achieved by well-intergrown MFI membranes made after secondary hydrothermal growth on ceramic supports followed by calcination, it shows that isomer selective molecular sieving from a membrane made by 2D porous layers is feasible. It is believed that further improvements in nanosheet aspect ratio and packing will result in better performance. Incorporation of a polymer, organic or inorganic component in the suspension and/or deposit may also block defects and increase selectivity.

Pore-opened zeolite nanosheets can be used as building blocks for zeolite membranes, e.g., for molecular adsorption or molecular separation (e.g., selective separation of isomers). Conventionally, zeolite nanosheets are made using organic additives that end up in the micropores. These organics have to be removed to allow for transport of molecules (molecular sieving). Up to now, the zeolite nanosheets were deposited on inorganic supports and the organics were removed from the micropores by high temperature calcination. Typically, the lowest temperature at which calcination (thermal detemplation) can achieve full opening of the micropores is ~300° C. This temperature is too high for polymeric supports. In contrast, zeolite nanosheets formed using the disclosed methods may be used with polymeric supports because the organic molecules are removed from the micropores using a wet chemical approach at low temperature (e.g., <100° C.) and they are obtained as a suspension (in non-aggregated form) in water.

In some embodiments, pore-opened zeolite nanosheets can be components of composite materials. For example, the nanosheets can form one or more layers of a composite that is built up layer by layer. For example, pore-opened zeolite nanosheets can be incorporated in organic polymer or inorganic composites.

A number of embodiments have been described. Other embodiments are in the claims.

What is claimed is:

1. A method, comprising:
   exposing a multi-lamellar (ML) zeolite material comprising an organic structure directing agent (OSDA) to a mixture comprising sulfuric acid and hydrogen peroxide under conditions sufficient to remove substantially all of the OSDA from the ML zeolite material; and
   after exposing the ML zeolite material, treating a solution containing the ML zeolite material to sonication and/or mixing under conditions sufficient to substantially exfoliate layers of the ML zeolite to obtain porous two-dimensional zeolite nanosheets that are substantially free of the OSDA.

2. The method of claim 1, wherein the ML zeolite material comprises an WI zeolite.

3. The method of claim 1, wherein the ML zeolite material comprises an MWW zeolite.

4. The method of claim 1, wherein the mixture comprises at least 2.5 parts sulfuric acid to 1 part hydrogen peroxide by volume.

5. The method of claim 4, wherein the mixture comprises no more than 7 parts sulfuric acid to 1 part hydrogen peroxide by volume.

6. The method of claim 1, wherein exposing the ML zeolite material comprises providing the ML zeolite material in the sulfuric acid and adding the hydrogen peroxide to the sulfuric acid or by preparing a mixture of sulfuric acid and hydrogen peroxide and adding the ML zeolite to the mixture.

7. The method of claim 1, further comprising synthesizing the ML zeolite material using the OSDA prior to exposing the ML zeolite material.

8. The method of claim 1, wherein the ML zeolite material is exposed to the mixture for a time sufficient to remove the OSDA to a desired level.

9. The method of claim 1, wherein the ML zeolite material is exposed to mixtures comprising sulfuric acid and hydrogen peroxide multiple times to remove substantially all of the OSDA from the ML zeolite material.

10. The method of claim 1, wherein the sonication or mixing is performed by a technique selected from the group consisting of bath sonication, horn sonication, vortexing, and shaking including combinations of them.

11. The method of claim 1, wherein the solution containing the ML zeolite material is an aqueous solution.

12. A method of forming a zeolite membrane, comprising:
   obtaining porous two-dimensional zeolite nanosheets using the method of claim 1; and
   forming the zeolite membrane using the porous two-dimensional zeolite nanosheets.

13. A method, comprising:
   exposing a zeolite nanosheet material comprising an organic structure directing agent (OSDA) to a mixture comprising sulfuric acid and hydrogen peroxide under conditions sufficient to remove substantially all of the OSDA from the zeolite nanosheet material; and after exposing the zeolite nanosheet material, dispersing it in a polar solvent.

14. The method of claim 13, where the polar solvent is water.

15. The method of claim 13, further comprising, prior to exposing the zeolite nanosheet material to the mixture, exfoliating a ML zeolite material to provide the zeolite nanosheet material.

16. The method of claim 15, wherein the ML zeolite material is exfoliated by melt blending.

17. A method of forming a zeolite membrane, comprising:
obtaining porous two-dimensional zeolite nanosheets using the method of claim 13; and
forming the zeolite membrane using the porous two-dimensional zeolite nanosheets.

* * * * *

UNITED STATES PATENT AND TRADEMARK OFFICE
CERTIFICATE OF CORRECTION

PATENT NO. : 10,213,748 B2
APPLICATION NO. : 15/386217
DATED : February 26, 2019
INVENTOR(S) : Michael Tsapatsis, Qiang Xiao and Han Zhang It is certified that error appears in the above-identified patent and that said Letters Patent is hereby corrected as shown below:

In the Claims

Column 14, Line 30: In Claim 2, delete "WI" and insert -- MFI --, therefor.

Signed and Sealed this
Sixteenth Day of April, 2019

Andrei Iancu
*Director of the United States Patent and Trademark Office*